United States Patent [19]

Hoene

[11] 4,371,676

[45] Feb. 1, 1983

[54] PREPARATION OF CYCLOPENTADIENE/ACETYLENICALLY UNSATURATED COMPOUND COPOLYMERS

[75] Inventor: Richard Hoene, Heidelberg, Fed. Rep. of Germany

[73] Assignee: BASF Aktiengesellschaft, Fed. Rep. of Germany

[21] Appl. No.: 251,920

[22] Filed: Apr. 7, 1981

[30] Foreign Application Priority Data

May 8, 1980 [DE] Fed. Rep. of Germany ....... 3017619

[51] Int. Cl.³ .................... C08F 38/00; C08F 36/00
[52] U.S. Cl. ................................ 526/76; 526/75; 526/272; 526/285; 526/290
[58] Field of Search .............. 526/75, 76, 285, 290

[56] References Cited

U.S. PATENT DOCUMENTS

| | | | |
|---|---|---|---|
| 2,093,749 | 9/1937 | Derby | 526/290 |
| 3,438,957 | 4/1969 | Hsieh | 526/75 |
| 3,468,837 | 9/1969 | Wheeler et al. | 526/290 |
| 3,746,695 | 7/1973 | Ofstead | 526/75 |
| 3,953,407 | 4/1976 | Hayashi et al. | 526/290 |
| 4,071,676 | 1/1978 | Werner et al. | 526/283 |

FOREIGN PATENT DOCUMENTS 2522080  5/1975  Fed. Rep. of Germany.

*Primary Examiner*—Harry Wong, Jr.
*Attorney, Agent, or Firm*—Keil & Witherspoon

[57] ABSTRACT

A process for the preparation of cyclopentadiene copolymers, wherein cyclopentadiene, dicyclopentadiene, tricyclopentadiene, their $C_1$–$C_3$-alkyl derivatives or co-dimers of cyclopentadiene with a diene of 4 or 5 carbon atoms are reacted with acetylenically unsaturated compounds, with or without other copolymerizable olefinically unsaturated monomers, at from 200° to 320° C. The cyclopentadiene polymers prepared according to the invention may be used, for example, as resin additives for surface coatings, tackifiers in adhesives or resins for printing inks.

3 Claims, No Drawings

PREPARATION OF CYCLOPENTADIENE/ACETYLENICALLY UNSATURATED COMPOUND COPOLYMERS

The present invention relates to a process for the preparation of cyclopentadiene copolymers from cyclopentadiene or its derivatives and acetylenically unsaturated compounds.

By thermally initiated polycycloaddition, it is possible to prepare hydrocarbon resins which are based on cyclopentadiene units and bear carbon-carbon double bonds at the terminal groups. There have been many attempts to provide cyclopentadiene resins additionally with other functional groups; the best-known is the reaction with maleic anhydride. To introduce ester groups or hydroxyl groups, it has been proposed to copolymerize dicyclopentadiene with acrylic esters or methacrylic esters, vinyl esters or allyl compounds. The proportion of functional groups in the polymers is however restricted by the fact that the copolymers are incorporated substantially at the terminal positions and that the primary cycloaddition products of the vinyl compound and the cyclopentadiene often have a lower reactivity and therefore do not copolymerize readily. Accordingly, for example, the OH numbers achievable with monomers containing hydroxyl functional groups are relatively low.

It is an object of the present invention to provide an improved process for the preparation of cyclopentadiene copolymers by thermal polymerization, using novel comonomers suitable for this purpose.

We have found that this object is achieved, according to the invention, by using acetylenically unsaturated compounds.

The present invention relates to a process for the preparation of cyclopentadiene copolymers, wherein (a) from 10 to 99% by weight of cyclopentadiene, dicyclopentadiene, tricyclopentadiene, their $C_1-C_3$-alkyl derivatives or co-dimers of cyclopentadiene with a diene of 4 or 5 carbon atoms, (b) from 1 to 50% by weight of acetylenically unsaturated compounds and (c) from 0 to 40% by weight of other copolymerizable olefinically unsaturated monomers are reacted together at 200°-320° C., the sum of the percentages (a), (b) and (c) being 100.

In one embodiment of the process according to the invention, components (a), (b) and (c) may first be subjected to a Diels-Alder reaction and then be polymerized at 200°-320° C., thermally or with addition of a source of free radicals.

Suitable acetylenically unsaturated compounds (b), in addition to acetylene itself, are those which contain, in addition to one or more alkynyl groups, one or more hydroxyl, amino, carboxyl, aldehyde, alkyl, aryl or aralkyl groups or halogen atoms.

Specifically, the following is to be noted in respect of the process according to the invention and of the reactants employed.

(a) Suitable components (a) are cyclopentadiene, dicyclopentadiene, tricyclopentadiene, their $C_1-C_3$-alkyl derivatives, especially the methyl derivatives, and co-dimers of cyclopentadiene with another diene of 4 or 5 carbon atoms, as well as mixtures of these compounds. In general, it is advantageous to use mixtures obtained by dimerizing the $C_5$ fraction of the vapor phase cracking of mineral oil, and removing the volatile constituents. In such mixtures the main constituent is dicyclopentadiene, with lesser amounts of cyclopentadiene, tricyclopentadiene, tetracyclopentadiene, co-dimers of cyclopentadiene with diolefins, eg. butadiene, isoprene or piperylene, or the corresponding compounds derived from methylcyclopentadiene.

As a rule, it is not necessary to ensure that the dicyclopentadiene fraction is particularly pure; however, the purity should usually not be below 85% by weight. The monomers (a) are in general employed in amounts of from 10 to 99, preferably from 30 to 95,% by weight, based on the sum of (a)+(b)+(c).

(b) Examples of suitable acetylenically unsaturated compounds (b) are acetylene, propyne and butyne; carboxyl-containing acetylene derivatives, eg. propiolic acid and acetylenedicarboxylic acid; hydroxyl-containing acetylene derivatives, eg. propargyl alcohol, but-2-yne-1,4-diol, hex-3-yne-2,5-diol, but-1-yn-3-ol, 2-methylbut-3-ynol, 2,3-methylpent-1-yn-3-ol, 3,4-dimethylpent-1-yn-3-ol, 3-ethylpent-1-yn-3-ol, 3-isopropyl-4-methylpent-1-yn-3-ol, 3-methylhex-1-yn-3-ol, 3-propylhex-1-yn-3-ol, dihydrolinalool and 1-ethynylcyclohexanol; amino-containing acetylene derivatives, eg. 1,1-dimethylprop-2-ynylamine, 1,1-diethylprop-2-ynylamine, 1-ethynylcyclohexylamine, 4-diethylaminobut-2-yn-1-ol and 5-diethylaminopent-3-ynol; and halogen derivatives, eg. propargyl chloride and but-3-yne-2-chloride. Amongst these, propargyl alcohol, but-2-yne-1,4-diol, 1-ethynylcyclohexanol, acetylenedicarboxylic acid, 1-ethynylcyclohexylamine, 4-diethylaminobut-2-yn-1-ol, 5-diethylaminopent-3-yn-2-ol, 2-methylbut-3-yn-2-ol, 3-chloroprop-1-yne and propargyl chloride are particularly preferred.

In general, monomers (b) account for from 1 to 50, preferably from 3 to 40,% by weight, based on (a)+(b)+(c). However, higher proportions can also be employed.

(c) Suitable monomers (c) are the conventional olefinically unsaturated monomers which are copolymerizable with cyclopentadiene. They include compounds containing $\alpha,\beta$-olefinically unsaturated carboxylic acid units, eg. acrylic acid, methacrylic acid or maleic anhydride, maleic acid, fumaric acid and itaconic acid, their monoesters and diesters with $C_1-C_{18}$-alkanols and their imides and monoamides derived from $NH_3$, or from primary or secondary alkylamines and alkanolamines; olefinically unsaturated nitriles, eg. acrylonitrile; acrylic acid esters and methacrylic acid esters of alkanols of 1 to 20, preferably of 1 to 12, carbon atoms, eg. methyl acrylate and methacrylate, hydroxyalkyl acrylates and methacrylates, eg. hydroxypropyl acrylate, hydroxyethyl acrylate, glycidyl acrylate and glycidyl methacrylate; vinyl esters, eg. vinyl formate and vinyl acetate; allyl compounds eg. allyl alcohol, allylamine, allyl acetate, allyl glycidyl ether, allyl chloride, butenol and butenediol; vinyl halides, eg. vinyl chloride; vinyl ethers, eg. methyl vinyl ether, ethyl vinyl ether and hydroxybutyl vinyl ether; monoolefins and diolefins, eg. ethylene, propylene, butene, pentene, hexene, cyclohexene, dodecene and octadecene; and dienes, eg. butadiene, isoprene, piperylene and hexadiene; unsaturated fatty acids and their derivatives, eg. oleic acid, linoleic acid and linolenic acid, their glycerides, eg. linseed oil, fish oil, soybean oil, wood oil, castor oil and tall oil; synthetic oils, eg. polybutadiene oil; and natural and synthetic unsaturated resins, eg. rosin and hydrocarbon resins obtained, for example, from $C_5$- or $C_9$-cuts by cationic polymerization. The proportion of monomers (c) is in general from 0 to 40% by weight, based on total monomer mixture.

The polymers are prepared at from 200° to 320° C. under autogenous pressures of from 3 to 200 bar. Below the stated temperature range, resin formation is incomplete; above 320° C., crosslinking reactions may occur. In general, the preferred temperature range is from 230° to 290° C.

The polymers may be prepared in the presence or absence of a solvent; as a rule, solvents lower the molecular weight and the softening point. Usually, inert solvents are employed, for example aromatics, eg. benzene, toluene or xylenes, aliphatic hydrocarbons, eg. gasoline or cyclohexane, ketones, eg. acetone or methyl ethyl ketone, ethers, eg. tetrahydrofuran, esters, eg. ethyl acetate, ether-esters, eg. butylglycol acetate, chlorohydrocarbons, eg. methylene chloride, ethylene chloride, propylene chloride and chlorobenzene, and mixtures of such solvents. Solvents or reactive concomitants possessing functional groups, for example alcohols, phenols or epoxides, may also be present.

It is advantageous, but not absolutely essential, to carry out the reaction under an inert gas, for example $N_2$.

It is possible to increase the yield of the reaction by using a source of free radicals, such as a peroxide, hydroperoxide, per-ester or azo compound, but such use is in general not absolutely essential.

The reaction time required to prepare the resins is usually from a few minutes to several hours; industrially, the reaction may be carried out either continuously or batchwise. As is the case with conventional hydrocarbon resins, the novel products may also be further modified, in a conventional manner, by hydrogenation, reaction with maleic anhydride, esterification, reaction with phenols or phenolic resins, salt formation, epoxidation or boiling with unsaturated oils, in order to make them more suitable for a particular application. In particular, hydrogenation is useful for preparing light-colored low-odor resins possessing good solubility in polar and non-polar solvents; the hydrogenation may or may not be coupled with modification of the functional groups in such resins.

After polymerization and, where relevant, further modification, the resins can, if desired, be degassed under reduced pressure at an elevated temperature, and this treatment can in particular have a major effect on the softening point of the product. The low molecular weight distillates obtained from such degassing may, where appropriate, be recycled to the reaction, this being particularly advisable where a continuous procedure is employed.

The novel products in general have softening points of up to 200° C., molecular weights of from 300 to 1,500 and hydrogenation iodine numbers of from 20 to 200. They, and the modified products obtained from them, may be used for diverse applications, for example as resin additives for surface coatings, tackifiers for adhesives or resins for printing inks. The OH-containing resins can also be used to prepare polyesters and polyurethanes. The COOH-containing resins are particularly suitable for use in (unsaturated) polyesters or, as is also true of resins with functional amino groups, as constituents of epoxy resins, or as glues.

The Examples which follow illustrate the process of the invention, without implying any limitation.

The properties of the products given in the Examples are determined as follows:

Iodine number (I.No.):

Catalytic hydrogenation over a Pd catalyst in tetrahydrofuran; the equivalent amount of iodine in mg/100 g of substance is recorded.

Softening point (S.P.):

This is determined on a Kofler heated stage, the temperature of the plate at which the resin sample begins to stick being recorded.

Molecular weight ($\overline{M}_n$):

This is determined by vapor pressure osmometry in benzene, using the method described by Elias, Makromoleküle, Hüthig und Wepf Verlag 1971, pages 229–238.

Acid number (Ac.No.):

This is determined by the method of DIN 53,402, the result being recorded in mg of KOH/g of substance.

OH number (OH No.):

This is determined by acylation with acetic anhydride/pyridine in a pressure tube, followed by hydrolysis and titration with KOH solution (similarly to DIN 53,402); the result is recorded in mg of KOH/g of substance.

Amine number (Am.No.):

This is determined by potentiometric titration in glacial acetic acid/dioxane, using 0.1 N $HClO_4$; the result is recorded in mg of KOH/g of substance.

In the Examples, parts and percentages are by weight, unless stated otherwise.

EXAMPLE 1

120 parts of 95% pure dicyclopentadiene (DCPD), 30 parts of acetylenedicarboxylic acid and 37.5 parts of xylene are heated for 1 hour to 270° C. under nitrogen in a stirred autoclave. The batch is then degassed at 200° C. and 10 mbar. The yield is 120 parts. The resulting brown resin has a molecular weight of 740, an iodine number of 83, a softening point of 112° C. and an acid number of 98.

The same procedure is used in the Examples tabulated below. In these, the abbreviations have the following meanings:

DCPD = dicyclopentadiene
CPD = cyclopentadiene
MA = maleic anhydride
THF = tetrahydrofuran
n.d. = not determined

EXAMPLES 2 TO 25 AND COMPARATIVE EXAMPLE V1

| No. | Parts | Starting Materials | Reaction conditions (°C.) | (hours) | Yield (parts) | $\overline{M}_n$ | I. No. | Ac. No. | OH No. | Am. No. | % N | % Cl | s.p. (°C.) |
|---|---|---|---|---|---|---|---|---|---|---|---|---|---|
| 2 | 120 | 95% pure DCPD | | | | | | | | | | | |
| | 30 | 1-ethynylcyclohexylamine | | | | | | | | | | | |
| | 37.5 | xylene | 270 | 1 | 121 | 450 | 84 | — | — | 76 | — | — | 20 |
| 3 | 120 | 95% pure DCPD | | | | | | | | | | | |
| | 30 | but-3-yne-2-chloride | | | | | | | | | | | |
| | 37.5 | xylene | 280 | 0.5 | 109 | 600 | 26 | — | — | — | — | 6.5 | 90 |

-continued

EXAMPLES 2 TO 25 AND COMPARATIVE EXAMPLE V1

| No. | Parts | Starting Materials | Reaction conditions (°C.) | (hours) | Yield (parts) | $\overline{M}_n$ | I. No. | Ac. No. | OH No. | Am. No. | % N | % Cl | s.p. (°C.) |
|---|---|---|---|---|---|---|---|---|---|---|---|---|---|
| 4 | 120 | CPD | | | | | | | | | | | |
|  | 30 | propargyl chloride | | | | | | | | | | | |
|  | 37.5 | xylene | 270 | 1 | 107 | 690 | 22 | — | — | — | — | 7.2 | 116 |
| 5 | 120 | 95% pure DCPD | | | | | | | | | | | |
|  | 30 | 4-diethylaminobut-2-yn-1-ol | 270 | 2 | 114 | 590 | 46 | — | — | n.d. | 4.1 | — | 72 |
| 6 | 120 | CPD | | | | | | | | | | | |
|  | 30 | 5-diethylaminopent-3-yn-2-ol | 270 | 2 | 118 | 580 | 81 | — | — | n.d. | 5.5 | — | 84 |
| 7 | 75 | 95% pure DCPD | | | | | | | | | | | |
|  | 75 | propargyl alcohol | | | | | | | | | | | |
|  | 37.5 | toluene | 270 | 1 | 144 | 830 | 39 | — | 96 | — | — | | 150 |
| 8 | 75 | 95% pure CDPD | | | | | | | | | | | |
|  | 75 | but-2-yne-1,4-diol | | | | | | | | | | | |
|  | 15 | ethylbenzene | 260 | 2 | 122 | 500 | 117 | — | 145 | — | — | | 80 |
| 9 | 75 | 85% pure DCPD | | | | | | | | | | | |
|  | 75 | 2-methylbut-3-yn-2-ol | | | | | | | | | | | |
|  | 50 | cyclohexane | 290 | 1 | 90 | 300 | 181 | — | 48 | | | | oil |
| 10 | 75 | 85% pure DCPD | | | | | | | | | | | |
|  | 75 | 1-ethynylcyclohexan-1-ol | 270 | 1 | 90 | 310 | 145 | — | 45 | | | | oil |
| 11 | 75 | 85% pure DCPD | | | | | | | | | | | |
|  | 75 | 2-methylbut-3-yn-2-ol | | | | | | | | | | | |
|  | 75 | xylene | 300 | 10 | 122 | 370 | 90 | — | 111 | | | | 45 |
| 12 | 80 | 95% pure DCPD | | | | | | | | | | | |
|  | 40 | propargyl alcohol | | | | | | | | | | | |
|  | 30 | xylene | 230 | 1 | 7 | n.d. | n.d. | — | n.d. | | | | 44 |
| 13 | 65 | 95% pure DCPD | | | | | | | | | | | |
|  | 55 | propargyl alcohol | | | | | | | | | | | |
|  | 6 | t-butyl hydroperoxide | | | | | | | | | | | |
|  | 30 | xylene | 230 | 1.5 | 72 | n.d. | n.d. | — | n.d. | | | | 53 |
| 14 | 55 | 95% pure DCPD | | | | | | | | | | | |
|  | 47 | propargyl alcohol | | | | | | | | | | | |
|  | 26 | xylene | 230 | 2 | 60 | n.d. | n.d. | — | n.d. | | | | 71 |
| 15 | as | 14 | 230 | 10 | 107 | n.d. | n.d. | — | n.d. | | | | 115 |
| 16 | 100 | 85% pure DCPD | | | | | | | | | | | |
|  | 30 | allyl alcohol | | | | | | | | | | | |
|  | 20 | propargyl alcohol | | | | | | | | | | | |
|  | 37.5 | Solvesso | 270 | 1 | 61 | 420 | 160 | — | 206 | | | | 58 |
| V1 | 100 | 85% pure DCPD | | | | | | | | | | | |
|  | 50 | allyl alcohol | | | | | | | | | | | |
|  | 37.5 | Solvesso | 270 | 1 | 32 | 310 | 160 | — | 145 | | | | 48 |
| 17 | 100 | 95% pure DCPD | | | | | | | | | | | |
|  | 30 | acetylenedicarboxylic acid | | | | | | | | | | | |
|  | 20 | propargyl alcohol | | | | | | | | | | | |
|  | 37.5 | THF | 270 | 1 | 82 | 520 | 83 | 51 | 12 | | | | 107 |
| 18 | 120 | 95% pure DCPD | | | | | | | | | | | |
|  | 30 | propargyl alcohol | | | | | | | | | | | |
|  | 30 | benzene | 280 | 4 | 123 | 680 | 167 | — | 104 | | | | 165 |
| 19 | 120 | 95% pure DCPD | | | | | | | | | | | |
|  | 30 | but-2-yne-1,4-diol | | | | | | | | | | | |
|  | 30 | benzene | 280 | 4 | 137 | 640 | 181 | — | 147 | | | | 158 |
| 20 | 100 | 95% pure DCPD | | | | | | | | | | | |
|  | 30 | vinyl acetate | | | | | | | | | | | |
|  | 20 | propargyl alcohol | | | | | | | | | | | |
|  | 40 | ethyl acetate | 270 | 1 | 116 | 410 | 91 | — | 90 | | | | 144 |
| 21 | 100 | 85% pure DCPD | | | | | | | | | | | |
|  | 30 | MA | | | | | | | | | | | |
|  | 20 | propargyl alcohol | | | | | | | | | | | |
|  | 40 | methyl ethyl ketone | 270 | 1 | 135 | 300 | 108 | 135 | 93 | | | | 25 |
| 22 | 100 | 85% pure DCPD | | | | | | | | | | | |
|  | 30 | styrene | | | | | | | | | | | |
|  | 20 | propargyl alcohol | | | | | | | | | | | |
|  | 40 | toluene | 270 | 1 | 95 | 300 | 124 | — | 95 | | | | 20 |
| 23 | 100 | 95% pure DCPD | | | | | | | | | | | |
|  | 30 | methyl methacrylate | | | | | | | | | | | |
|  | 20 | propargyl alcohol | | | | | | | | | | | |
|  | 40 | toluene | 270 | 1 | 120 | 430 | 98 | — | 125 | | | | 82 |
| 24 | 100 | 95% pure DCPD | | | | | | | | | | | |
|  | 30 | phenol | | | | | | | | | | | |
|  | 20 | propargyl alcohol | | | | | | | | | | | |
|  | 40 | toluene | 270 | 1 | 128 | 520 | 79 | n.d. | 106 | | | | 87 |
| 25 | 80 | 95% pure DCPD | | | | | | | | | | | |
|  | 30 | styrene | | | | | | | | | | | |
|  | 20 | vinyl acetate | | | | | | | | | | | |
|  | 20 | propargyl alcohol | | | | | | | | | | | |
|  | 40 | toluene | 270 | 1 | 109 | 610 | 68 | — | 102 | | | | 117 |

Two control experiments were carried out to test whether the polymerization products still contained unreacted alkyne compounds.

Resins No. 18 and 19 were titrated with 0.1 N AgNO$_3$ solution to determine the C≡C content; the consumption in each case was 0.6 ml/g of substance, which was within the limit of error. It follows that the acetylenically unsaturated compounds copolymerize with DCPD to form carbon-carbon single bonds and/or double bonds.

As is shown by Example 16 and Comparative Example VI, the use of propargyl alcohol instead of allyl alcohol, under identical reaction conditions, gives higher yields of resin, a higher OH number and a higher molecular weight, which again demonstrates the advantage of the process according to the invention.

We claim:

1. A process for the preparation of a cyclopentadiene copolymer which comprises: polymerizing
   (a) from 10 to 99% by weight of cyclopentadiene, dicyclopentadiene, tricyclopentadiene, their $C_1$–$C_3$-alkyl derivatives or co-dimers of cyclopentadiene with a diene of 4 or 5 carbon atoms,
   (b) from 1 to 50% by weight of at least one acetylenically unsaturated compound which in addition to one or more alkynyl groups contains one or more hydroxyl, amino, carboxyl, aldehyde, alkyl, aryl or aralkyl groups or halogen atoms and
   (c) from 0 to 40% by weight of other copolymerizable olefinically unsaturated monomers,
   at a temperature of from 200° to 320° C., either thermally or with addition of a source of free radicals, the sum of the percentages (a), (b) and (c) being 100.

2. The process of claim 1, wherein components (a), (b) and (c) are first subjected to a Diels-Alder reaction and are then polymerized at from 200° to 320° C., either thermally or with addition of a source of free radicals.

3. The process of claim 1, wherein component (b) consists of one or more of the compounds propargyl alcohol, but-2-yne-1,4-diol, 1-ethynylcyclohexanol, acetylenedicarboxylic acid, 1-ethynylcyclohexylamine, 4-diethylaminobut-2-yn-1-ol, 5-diethylaminopent-3-yn-2-ol, 2-methylbut-3-yn-2-ol, 3-chloroprop-1-yne or propargyl chloride.

* * * * *